United States Patent [19]

Snyder

[11] 4,323,613
[45] Apr. 6, 1982

[54] LAMINATE MATERIAL

[76] Inventor: Dennis Snyder, Rt. 1, Atwood Elems, Mineral City, Ohio 44656

[21] Appl. No.: 112,089

[22] Filed: Jan. 14, 1980

[51] Int. Cl.³ .................. B32B 27/12; B32B 27/20
[52] U.S. Cl. ................................. 428/111; 428/109; 428/110; 428/240; 428/242; 428/244; 428/246; 428/247; 428/402
[58] Field of Search .............. 428/402, 109, 110, 111, 428/244, 247, 255, 220, 368, 246, 253, 242, 332; 260/42.19, 42.41

[56] References Cited

U.S. PATENT DOCUMENTS

| | | | |
|---|---|---|---|
| 2,281,635 | 5/1942 | Strauss | 428/247 |
| 2,642,404 | 6/1953 | Pike | 260/41 B |
| 2,742,391 | 4/1956 | Ways | 428/247 |
| 3,222,237 | 12/1965 | McHelvy | 428/247 |
| 3,647,607 | 3/1972 | Hillers | 428/247 |
| 4,103,053 | 7/1978 | Barchas | 428/247 |
| 4,110,497 | 8/1978 | Hoel | 428/247 |
| 4,124,431 | 11/1978 | Schramer et al. | 428/522 |

Primary Examiner—James J. Bell
Attorney, Agent, or Firm—Trexler, Bushnell & Wolters, Ltd.

[57] ABSTRACT

A substantially light-impervious laminate material is provided. In one embodiment, the material includes a first relatively light-reflective (white) polyvinyl chloride sheet, an open scrim sheet, a second relatively light-reflective (white) polyvinyl chloride sheet, and a relatively light-absorbtive (black) bonding agent permeating the scrim sheet and binding together the first sheet, the second sheet and the scrim sheet. Preferably this bonding agent contains aluminum pigment and carbon black pigment.

A method of continuously making this laminate material is also provided. The laminate is made by twice coating the underside of the top laminate sheet with the bonding agent, pressing the scrim sheet against the bonding agent and top sheet underside, stripping the scrim sheet from the top sheet underside, and re-pressing the scrim sheet against the top sheet underside. Next, the top sheet, bonding agent and scrim sheet are heated, and a hot bottom sheet is pressed against the hot scrim sheet. The laminate is then cooled. The finished product can be produced at relatively low cost, yet the occurrence of "pinholes", "slits" and other imperfections is discouraged.

13 Claims, 3 Drawing Figures

LAMINATE MATERIAL

BACKGROUND OF THE INVENTION

This invention relates generally to a light-impervious laminate material, and a method of manufacturing it.

Flexible light-impervious sheets are quickly used in window shades, in curtains, for photographic endeavors, and in many other applications. These flexible sheets must be low in cost, yet the light-impervious nature of the sheet must be perfect, or nearly so. In modern practice, these light-impervious sheets are laminates; that is, they comprise a number of relatively thin polyvinyl chloride plies or sheets which are bonded together. A striped laminate, which is not necessarily light-impervious, is described and claimed in U.S. Pat. No. 4,110,497.

Most if not all currently offered light-impervious sheets include five layers in the laminate. At the top is a white sheet of some 2 mils thickness. Below this white sheet is a 2 mil thick black sheet, and below the black sheet is a fibrous scrim sheet. Since the fibers overlay one another to at least some extent, this scrim sheet is about 10 mils thick. Below the scrim sheet is a second 2 mil thick black sheet. Below the bottom black layer is another white sheet of about 2 mils thickness. A common adhesive, which is white or light-colored, permeates the scrim and bonds the two black sheets to the opposite scrim sides. The outer light-colored sheets are bonded to the inner, dark sheets by heat and pressure.

Attempts have been made to construct light-impervious vinyl laminates of only four layers by eliminating one of the two interior or black sheets. These attempts have not always been entirely successful, however; in both the four-sheet and the five-sheet laminates, flaws can and do appear.

More specifically, close inspection of the finished product sometimes reveals "pinholes". These "pinholes" are small areas of imperfection in the manufactured product which permit light to pass through the sheet. Sometimes "slits"—generally elongated imperfections permitting light passage—can appear. "Thins" can also appear: these are spots where one or more laminate plies are of insufficient thickness, and an extended area of low light imperviousness results. Small air bubbles or other flaws can occur during the manufacturing process.

In the four-sheet laminate, two plies are bonded to one side of the scrim sheet and only one thin ply is bonded to the opposite side of the scrim sheet, and an "unbalanced" construction is thus provided. This "unbalanced" construction can mean that the finished product is susceptible to curling, and to separation and tearing at the black sheet, or occasionally at the other sheets.

The five-layer laminate is relatively expensive to manufacture. Aligning all five sheets of the finished product can be difficult and requires continuous close quality control efforts by production personnel. If a white sheet is thin or imperfectly made, the underlying dark sheet can show through, giving an unpleasant or impermissible "smudged" look to the finished product.

It is accordingly an object of the present invention to provide light-impervious flexible sheeting of high quality yet low cost.

More specifically, it is an object to provide a light-impervious flexible sheet product without air bubbles, "pinholes", "slits", "thins" or "smudges". A related object is to provide a method of manufacturing which minimizes or eliminates these imperfections in the end product.

Another object is to provide an end product sheet and a method of manufacturing this material which permits the manufacture of the desired end product at low cost.

Other objects and advantages of the invention will become apparent upon reading the following detailed description, and upon reference to the drawings. Throughout the drawings, like reference numerals refer to like parts.

DETAILED DESCRIPTION

While the invention will be described in connection with a preferred embodiment and procedure, it will be understood that it is not intended to limit the invention to these embodiments or procedures. On the contrary, it is intended to cover all alternatives, modifications, and equivalents as may be included within the spirit and scope of the invention as defined by the appended claims.

Figure 1:
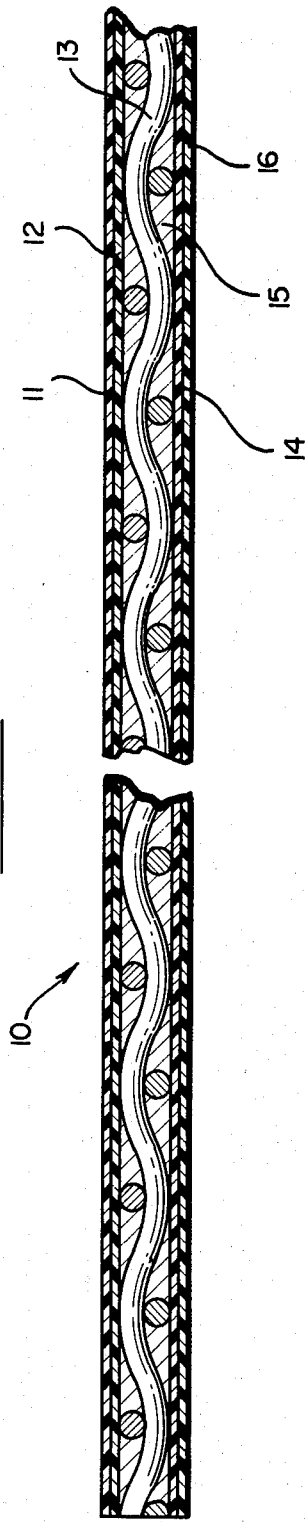
FIG. 1 is a cross-sectional view of a prior art five-ply flexible light barrier material, each ply or layer being magnified in thickness for clarity.

Turning first to FIG. 1, there is shown a portion of a flexible light-impervious barrier 10 of the prior art. Here, this laminate 10 includes a top ply or sheet 11 formed of polyvinyl chloride or other suitable material. This top sheet 11 is relatively thin—again, it is on the order of 2 mils thick. This second sheet 12 is of a dark color; here, it is black.

Below the second or black layer 12 is a scrim sheet 13 to provide strength and body to the completed material. This scrim sheet is composed of mingled fibers; here, this sheet is a woven polyvinyl chloride fabric about 10 mils thick.

Below the scrim sheet 13, a second black sheet 14 is provided. This second black sheet 14 can be identical in construction, thickness and color with the first black sheet 12.

Infused through the scrim sheet 13 is a bonding agent 15 which holds together the scrim sheet 13 and adjacent interior layers 12 and 14. This bonding agent can be a plastisol which is light-colored or white in appearance.

Below the second black sheet 14 is a second or underside outer sheet 16. This sheet is usually light colored or white in appearance and can be identical with the first or top sheet 11 in construction, thickness and color. These outer sheets 11 and 16 are bonded to the inner sheets 12 and 14 respectively during manufacture by heat and pressure, although a bonding agent can be used if desired.

Figure 2:
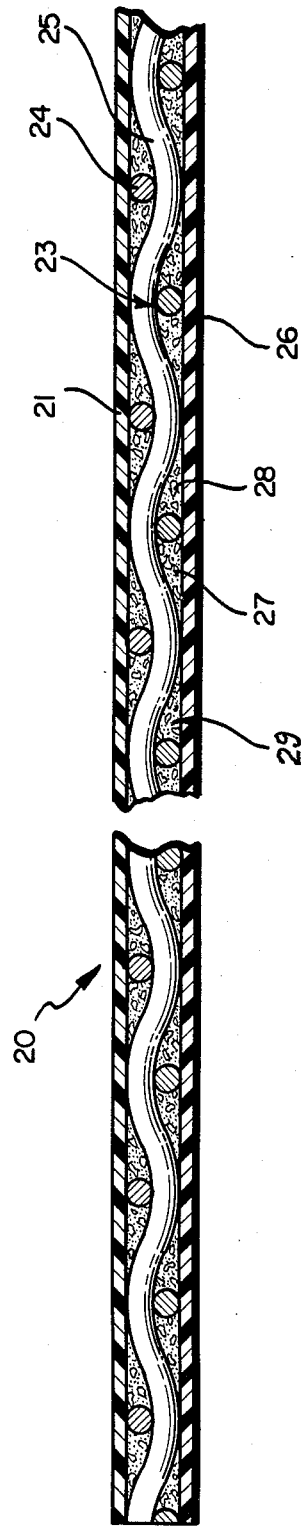
FIG. 2 is a cross-sectional view of the novel material manufactured in accordance with the present invention, the plies or thicknesses of the constituent layers again being magnified for clarity.

In accordance with the invention, a light-impervious sheeting 20 of high quality yet of low cost as illustrated in FIG. 2 can be provided. This laminate material comprises a first relatively light-reflective polyvinyl chloride sheet 21. Here, this light-reflective or light-colored sheet is white, and is slightly thicker than the outer sheets illustrated in FIG. 1. Sheets of light tan—an "egg shell" color—and other colors have been successfully used. This sheet 21 here is on the order of 3 mils thick.

An open scrim sheet 23 is provided below the top sheet 21. This open scrim sheet includes a number of mingled strands 24 and 25 which can be woven together in interlaced, serpentine manner. The scrim sheet in the illustrated embodiment has a thickness on the order of 10 mils.

Below this scrim sheet is a second relatively light-reflective polyvinyl chloride sheet 26. This sheet, like the top sheet 21, is a light-reflective color, and here is colored white. Again, a sheet of another color could be used. The sheet is on the order of 3 mils thick.

A relatively light-absorptive plastisol bonding agent 29 permeates the scrim sheet 23 and binds together the first sheet 21, the bottom sheet 26 and the scrim sheet 23. To encourage light absorptive and like opacity properties in carrying out the invention, this bonding agent 29 is dark colored—here, it is black. To provide this black coloration, the polyvinyl chloride plastisol is formulated to contain a light-absorptive pigment. In the illustrated embodiment, about 1% to about 5% by weight carbon black 27 is mixed with the plastisol bonding agent.

Aluminum flake material 28 is also included. The aluminum flake material 28 reflects light into the carbon black where it is absorbed, and is itself a highly light-impervious material. Preferably, about 1% to about 25% aluminum flake material is included. Here, about 3½% by weight of such material is used.

Figure 3:
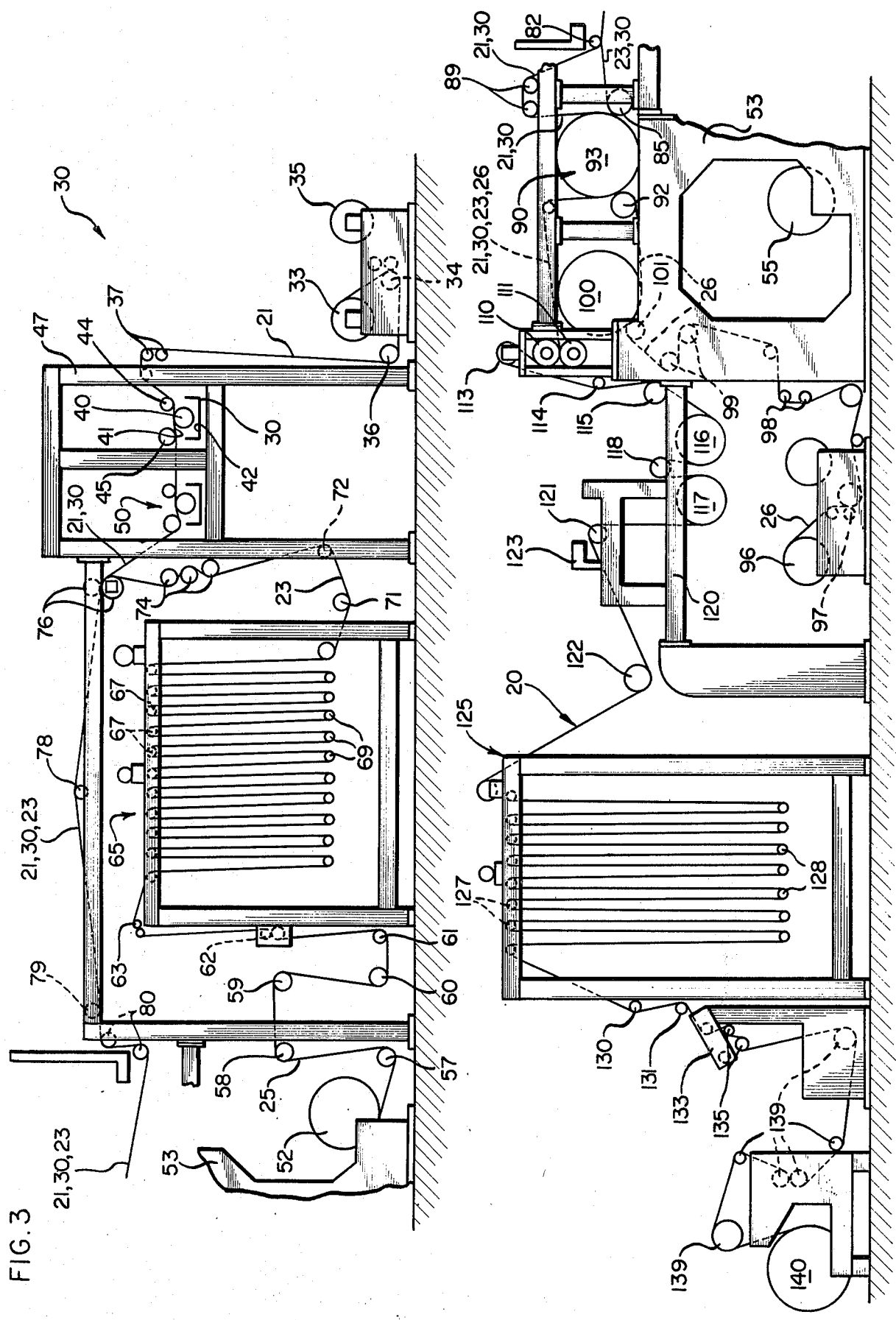
FIG. 3 is a side elevational view in somewhat schematic form showing apparatus and suggesting the novel method by which the invented material can be manufactured.

This material can be manufactured rapidly and at relatively low cost by using the apparatus 30 illustrated in FIG. 3. Here, the top ply film or material 21 is continuously drawn from a first pay out or supply roll 33 through an alignment mechanism 34. A second roll 35 of top ply film or material 21 can be mounted on appropriate journals adjacent the first roll 33; the fore-end of this rolled sheet material can be attached to the tail of the pay out roll 33 material with a "flying splice" as it passes through the alignment mechanism 34 in known manner. By using a number of supply rolls 33 and 35 in this way, an endless supply of materials can be passed through the manufacturing apparatus 30.

It will be understood that this top sheet can be formed or made in or on the laminating apparatus. That is, the top sheet (and/or the bottom sheet) can be formed by known sheet extruding or other forming processes in and on the laminating apparatus without departing from the present invention.

After the material 21 leaves the pay out roll 33 and passes through the alignment mechanism 34, it travels over an idler roller 36 and further alignment mechanism 37. The top ply material 21 is then passed over an adhesive dispenser or applicator roll 40 which applies the bonding agent 29 to an underside 41 of the top ply material 21 by conveying the plasticizing material or bonding agent from a trough 42 to the adjacent sheet undersurface 41. Guide rollers 44 and 45 position the top ply material 21 as it passes over this applicator roll 40. The supply of bonding agent 30 is maintained in the trough 42 by known apparatus or methods (not shown). The applicator trough 42 and the rollers 40, 44 and 45 are here carried upon an elevated mounting structure 47 to provide easy access for maintenance and repair to the various parts, and to position the material web for subsequent operations.

To encourage even, smooth, continuous, uninterrupted application of the adhesive 30 to the top ply underside 41, a second applicator apparatus 50 is provided, which provides a second adhesive coating to the undersurface 41 of the top ply material 21. In the illustrated embodiment, this applicator apparatus 50 is identical with the applicator apparatus previously described.

The open scrim material 23 is drawn from a supply roll 52 which can be conveniently mounted in the interior of the machine upon the journalling structure 53.

Again, a new supply roll 55 can be mounted closely adjacent the pay out roll 52 (as can be envisioned by juxtaposing the right end of the bottom portion of FIG. 3 with the left end of the top portion of FIG. 3). "Flying splices" can be made to provide an endless supply of scrim material for the manufacturing process. Scrim material 23 coming from the pay out or supply roll 52 passes over intermediate positioning, alignment, tensioning and idler rollers 57–62 inclusive. The scrim material 23 then passes through a final tensioner device 63 and into a festooner 65 having upper rolls 67 which are journalled upon a fixed support 68, and lower rolls 69 which are mounted not only for rotation but for vertical motion within the festooner 65.

It will be observed that an appreciable length of scrim 23 web is maintained within the festooner 65. This permits the machine operators to halt rotation of the scrim pay out roll 52 for adjustment or other reasons, and yet permits withdrawal of scrim material 23 through idler and alignment rollers 71 and 72 at the opposite end of the festooner 65. In this way, uninterrupted machine operation can continue even while a portion of the scrim web is halted for alignment, adjustment, or attachment of further web sections.

The scrim material 23 next passes through expander rollers 74 and thence to lead-in rollers 76 where the scrim material 23 is mated with the top ply material 21 and adhesive 29 adhering to the underside 41 of that top ply material 21. These material webs 21 and 23 then pass over guide rollers 78, 79 and 80.

In carrying out the invention, the top ply and scrim ply are further handled to enhance the light-interdicting properties of the finished product. To this end, the combined top ply 21, bonding agent 29 and scrim ply 23 are brought to a separating station, here shown as a roller 82 (at the right side of the bottom portion of FIG. 3). At the roller 82, the scrim 23 and some bonding agent are pulled away from the top ply 21 and some bonding agent. The scrim 23 is brought directly to a nip roller 85 while the top ply 21 are brought over spacer or idler rollers 89.

The top ply 21 and the scrim ply 23 are brought together again at a heat bonding work station 90. Here, this bonding station includes a primary heat roller 93 and the first nip roller 85. At this bonding station 90, the primary heating roller 93 receives the readied top ply material 21, 30 and the readied scrim material 23, 30 is impressed against it by the nip roller 85. As the material passes around the heat roller periphery, the material is heated sufficiently to lose its elasticity and plastic memory, and to drive off any water present in the adhesive, leaving a vinyl adhesive base. Pressure applied by a second nip roller 92 forces the scrim sheet 23 against the top ply material 21 to form a unitized, strong, long-wearing laminate. Typically, the heat roller 93 and nip rollers 85 and 92 apply a temperature of above 250° F. and a pressure of up to about 3,000 psi to the webs.

The nip roller 92 and heat roller 93 also force the bottom sheet 26 against the scrim sheet 25 and adhesive 30. To this end, a supply of the bottom material 26 is carried on a roller 96 positioned generally in the interior of the forming apparatus 30. This bottom ply film or material 26 is pulled through preliminary positioner and alignment guides and straightening roll mechanisms 97 similar to the top ply alignment mechanism 34. The material 26 then passes through idler rollers 98 and adjustment devices 99 and is fed to a preliminary heating roller 100. A preliminary nip roller 101 is provided to press the bottom ply material web 26 against the preliminary heating roller 100. The heated material then passes between the heat roller 93 and 92 of the primary heat station 90, and is bonded to the already-joined scrim sheet 23 and top sheet 21.

After the bonded product leaves the primary heat station 90, the web is introduced to chill rolls 110, 111 which are maintained at a reduced temperature by refrigeration or the like. These chill rolls set the web and restore material memory and resistance to tearing or damage. If desired, one or both rolls may be provided with an embossing surface to form a texture on one or both material sides.

The at least partly cooled web is now passed over further idler and guidance rollers 113, 114 and 115 to water rollers 116 and 117 and an intermediate idler roller 118. Cooled water is directed through these water rollers 116 and 117 to further cool and set the finished product and return it to ambient or room temperature. These water rollers 116 and 117 can be conveniently supported from appropriate superstructure 120.

As the finished product 20 passes from the water rollers 116 and 117, it is drawn through intermediate guidance rollers 121 and 122 where, if desired, a printing station 123 can be actuated to add product use or other information to the completed flexible laminate.

The web of finished material 20 is next introduced to a downstream festooner 125. Like the first festooner 65, this festooner 125 is provided with upper rollers 127 which are journalled in a fixed location, and with lower rollers 128 which are journalled for vertical motion. Thus, downstream portions of the web can be halted for inspection and repair, re-alignment, or removal from the production apparatus without halting operation of relatively upstream apparatus parts.

As the finished product 20 passes from the festooner 125, it is once again directed to guidance and idler rollers 130 and 131 before movement past an inspection station 133 and accommodating rollers 135. The inspected web then passes through the final idler, alignment and guidance rollers 139 to a take-up or winding roll 140.

When so constructed, the finished product 20 can be produced at relatively low cost at relatively great speed, yet is of relatively high quality. The occurrence of "thins", "smudges", "pinholes", or "slits" is minimized or eliminated entirely.

The invention is claimed as follows:

1. A substantially light-impervious laminate material comprising the combination of a first light-reflective polyvinyl chloride sheet, an open scrim sheet, a second light-reflective polyvinyl chloride sheet, and a light-absorptive pigmentary bonding agent permeating the scrim sheet and binding together the first sheet, the second sheet and the scrim sheet.

2. A laminate material according to claim 1 wherein at least one of said first and second sheets is light-colored, and wherein said pigmentary bonding agent is dark-colored.

3. A laminate material according to claim 2 wherein at least one of said first and second sheets is white in color.

4. A laminate material according to claim 1 wherein both of said first and second sheets are light-colored.

5. A laminate material according to claim 2 wherein both of said first and second sheets are white in color.

6. A laminate material according to claim 1 wherein each of said first and second sheets have a thickness on the order of 3 mils.

7. A laminate material according to claim 1 wherein said scrim sheet comprises a network of woven fibers.

8. A laminate material according to claim 1 or 2 wherein said bonding agent is plastisol.

9. A laminate material according to claim 4 wherein said pigmentary bonding agent includes carbon black.

10. A laminate material according to claim 4 wherein said pigmentary bonding agent contains aluminum pigment and carbon black.

11. A light-impervious laminate material comprising a first and second light-reflective polyvinyl chloride sheet and an open scrim sheet therebetween, said scrim sheet being bonded between the polyvinyl chloride sheets and said sheets being bonded together by a layer of a light-absorptive pigmentary bonding agent permeating said scrim sheet.

12. A laminate material according to claim 11 wherein said pigmentary bonding agent contains carbon black.

13. A laminate material according to claim 11 or 12 wherein said pigment contains aluminum.

* * * * *